Jan. 5, 1932. W. H. BAHAN 1,839,635
TEMPLE
Filed Dec. 15, 1930

Inventor
W. H. Bahan.
By Lacey & Lacey, Attorneys

Patented Jan. 5, 1932

1,839,635

UNITED STATES PATENT OFFICE

WILLIAM H. BAHAN, OF GREENVILLE, SOUTH CAROLINA, ASSIGNOR TO BAHAN TEXTILE MACHINERY COMPANY, OF GREENVILLE, SOUTH CAROLINA, A CORPORATION OF SOUTH CAROLINA

TEMPLE

Application filed December 15, 1930. Serial No. 502,522.

This invention relates to loom temples and its object is to provide a very simple and inexpensive device whereby wear upon the shank of the temple may be compensated and the shank maintained in proper position within the case. The invention is illustrated in the accompanying drawings and will be hereinafter fully set forth and defined.

Figure 1:
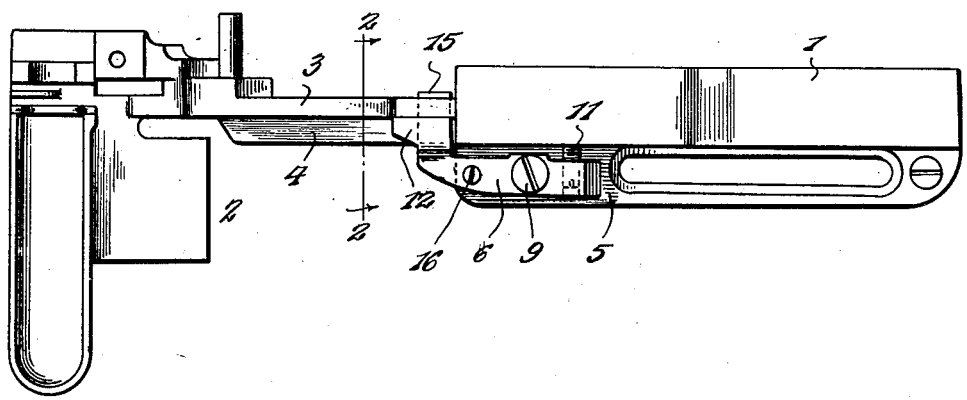
Figure 1 is a plan view of a temple having my invention applied thereto.
Figure 2:
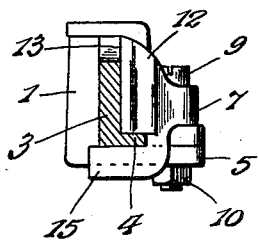
Fig. 2 is a section on the line 2—2 of Fig. 1.
Figure 3:
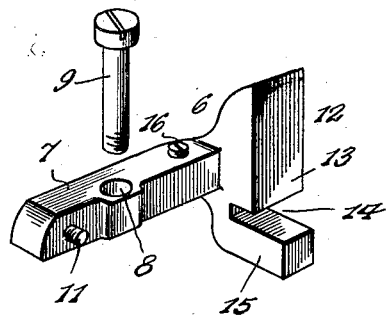
Fig. 3 is a detail perspective view of the attachment.

The case 1 and the temple 2 may be of the usual or any preferred form, the shank 3 of the temple usually having a rib or flange 4 on its inner side along its lower edge, as shown. The case 1 also is constructed with a flange or ledge 5 of the usual form, and in carrying out the present invention, said ledge 5 is utilized as a support for the attachment whereby to compensate for wear upon the shank and maintain the shank in proper position in the case. In use, the shank becomes worn so that it fits loosely within the case and, consequently, is apt to tilt therein and exert an uneven tension upon the cloth. To meet this objection, I provide a guide and presser block 6 which consists of a short bar 7 adapted to rest upon the ledge 5 and having a smooth bore opening 8 therethrough between its ends to receive a fulcrum bolt or cap screw 9 which is inserted through said opening and threaded through the ledge 5 and equipped below the ledge with a fastening nut 10, as shown. At its rear end, the bar 7 has a set screw 11 fitted therethrough, which set screw is adapted to bear against the side of the case 1 and thereby effect rocking of the bar 7 about the fulcrum bolt 9 to cause the front end of the bar to swing toward the shank and maintain the shank in its proper relation to the case, notwithstanding wear upon the shank. The front end of the bar is expanded vertically to define a head 12 having a flat face 13 presented to the side of the shank and adapted to bear against the same, as clearly shown in Fig. 2. A notch 14 is formed in the head 12 to accommodate the rib 4, and the lower portion of the head below the notch is extended laterally to form a lip 15 projecting under the shank, as clearly shown in Fig. 2, so that the shank will be positively supported against dropping, and wear upon the bottom of the shank, as well as upon the sides of the same, will be taken up. The set screw 11 permits a very fine adjustment of the holder and guide, and to maintain it in its set position, a second set screw 16 is mounted therein between the fulcrum 9 and the head 12 to bear upon the ledge 5 of the case and lock the device after it has been adjusted. It will be noted that the set screw 11 bears against the side of the case, while the set screw 16 acts at a right angle to the screw 11 and, consequently, the attachment is very firmly held in the position in which it may be set while the screw 16 will effect a vertical adjustment to compensate for wear upon the bottom of the shank so that dropping of the shank will be effectually avoided. The face 13 of the head 12 is flat and of sufficient area to bear upon the side of the shank through the entire vertical extent of the same and thereby avoid scoring of the shank, which would cause unnecessary wear upon the contacting surfaces, and the lip 15 provides a positive support for the shank so that it will remain true until it is entirely worn out.

Having thus described the invention, I claim:

The combination with a loom temple, and the case in which the temple is mounted, of a bar pivotally supported upon the ledge of the temple case and having one end projecting beyond the end of the ledge, a lateral head on said projecting end of the bar having a flat face arranged to bear against the side of the temple shank and a laterally projecting tongue below the head to extend under and support the shank, a set screw mounted in the rear end of the bar and bearing against the side of the temple case, and a second set screw mounted in the bar between the fulcrum of the same and the head thereof and bearing upon the ledge of the temple case.

In testimony whereof I affix my signature.

WILLIAM H. BAHAN.